US006872360B1

(12) United States Patent
Cohen et al.

(10) Patent No.: US 6,872,360 B1
(45) Date of Patent: Mar. 29, 2005

(54) CENTRIFUGING DEVICE FOR LABORATORY ANALYZER

(75) Inventors: Patrick Cohen, Deuil-la-Barre (FR); André Ohier, Mennecy (FR)

(73) Assignee: Fondation Jean Dausset-Ceph, Paris (FR)

( * ) Notice: Subject to any disclaimer, the term of this patent is extended or adjusted under 35 U.S.C. 154(b) by 0 days.

(21) Appl. No.: 09/807,513

(22) PCT Filed: Oct. 14, 1999

(86) PCT No.: PCT/FR99/02497

§ 371 (c)(1), (2), (4) Date: Jul. 6, 2001

(87) PCT Pub. No.: WO00/21678

PCT Pub. Date: Apr. 20, 2000

(30) Foreign Application Priority Data

Oct. 14, 1998 (FR) .......................................... 98 12871

(51) Int. Cl.[7] .......................... G01N 9/30; G01N 21/00; G01N 35/00; B04B 5/02

(52) U.S. Cl. .......................... 422/72; 422/99; 422/100; 422/63; 422/64; 422/65; 422/67; 436/45; 494/16; 494/20; 494/33; 494/81

(58) Field of Search .......................... 422/72, 100, 99, 422/64, 63, 65, 67; 494/16, 20, 81, 33; 436/45

(56) References Cited

U.S. PATENT DOCUMENTS

| | | | | |
|---|---|---|---|---|
| 1,831,860 A | * | 11/1931 | Harrison | 57/77 |
| 2,272,675 A | * | 2/1942 | Knudsen | 494/45 |
| 3,391,862 A | | 7/1968 | Jacobson | |
| 3,707,354 A | * | 12/1972 | Goodman | 422/72 |
| 3,747,842 A | | 7/1973 | Grubb | |
| 4,147,294 A | * | 4/1979 | Davidson et al. | 494/20 |
| 4,708,940 A | | 11/1987 | Yoshida | |
| 4,781,669 A | * | 11/1988 | Piramoon | 494/16 |
| 5,166,889 A | | 11/1992 | Cloyd | |
| 5,322,497 A | | 6/1994 | Kobayashi | |
| 5,601,522 A | * | 2/1997 | Piramoon | 494/16 |
| 5,834,420 A | * | 11/1998 | Laub et al. | 514/2 |

FOREIGN PATENT DOCUMENTS

| | | |
|---|---|---|
| DE | 34 25 922 | 1/1986 |
| EP | 0 025 945 | 4/1981 |
| FR | 2 462 197 | 2/1981 |
| FR | 2 497 468 | 7/1982 |
| FR | 2 629 370 | 10/1989 |
| JP | 59 092050 | 5/1984 |

OTHER PUBLICATIONS

Patent Abstract of Japan vol. 8, No. 205 (C–243), Sep. 19, 1984.

* cited by examiner

*Primary Examiner*—Jill Warden
*Assistant Examiner*—Brian R Gordon
(74) *Attorney, Agent, or Firm*—Foley & Lardner LLP

(57) ABSTRACT

A device for centrifuging various samples of a product or a mixture of products which are chemical or biological, the device including a vessel which is open at the top and contains a vertical central shaft driven in rotation by a rotary driving means, a horizontal plate mounted interlocked in rotation on the central shaft and provided on its surface with a plurality of through orifices for the mounting of tubes which are each intended to contain a volume of a sample to be centrifuged, these through orifices having a substantially elongate shape with front and rear walls inclined at an acute angle of less than 90 degrees relative to the horizontal, and means for indexing the position of the plate each time the plate stops, in order to position through orifices of the tubes at predetermined sites.

19 Claims, 7 Drawing Sheets

CENTRIFUGING DEVICE FOR LABORATORY ANALYZER

BACKGROUND OF THE INVENTION

The present invention relates to a device for centrifuging various samples of a product or a mixture of products which are chemical or biological.

In the field of chemistry or biochemistry, the centrifuging of samples is commonly employed to separate different phases (organic, aqueous) in order to extract and purify particular molecules.

In biology, the centrifuging of samples is often used to separate solid particles (cells or bacteria) held in suspension or even in emulsion in the liquid phase.

During the last thirty years, in the various fields of research in chemistry, in biochemistry or in biology, the trend has been to automate the majority of experimental protocols in order to meet criteria of production, speed, quantity and reliability.

This automation of the protocols is carried out using laboratory robots or analyzers mounted in proximity to the working plane on which said protocols are carried out.

These laboratory analyzers or robots generally comprise three mutually perpendicular axes X, Y and Z for the spatial positioning of a head provided with a liquid suction/dispensing system or provided with a gripping system, or alternatively equipped with these two systems.

The laboratory robot or analyzer can transfer reagents and/or biological solutions from one receptacle to the other, which is positioned at various sites on the working plane whose useful area is on average less than 0.3 $m^2$, with a view to conducting reactions, for example enzymatic or colorimetric reactions.

Automation of the experimental protocols requires the placement of all the elements needed for these protocols, for example the test tubes or other supports, the containers of reagents or samples to be processed, the various accessories, such as water-bath heating systems, cooling apparatus or the like, on the working-plane useful surface which is swept by the head of the laboratory analyzer or robot.

The centrifuging step does not currently form part of the steps of the automated experimental protocols, because the available centrifuging devices are not designed to cooperate with a laboratory robot or analyzer as mentioned above.

This is due to the fact that the currently known centrifuging device has a motor for driving a rotor in rotation, which always stops randomly relative to a given point. Since the laboratory robot or analyzer which is used does not have an integrated visualization system, such a robot or analyzer could not find the samples at a given site after the centrifuging step.

Furthermore, in the known centrifuging devices, the tubes intended to contain the samples to be centrifuged are oriented in a fixed position at a certain inclination relative to the axis of the rotor, so that when the rotor is rotating the samples do not escape from the tubes and the centrifuging concentrates are positioned toward the front of the tubes.

However, as mentioned above, a laboratory robot or analyzer works along three perpendicular axes X, Y, Z and cannot operate along an inclined axis.

It is hence incapable of sucking a part of the centrifuged sample placed in the bottom of the tubes, which are positioned so as to be inclined in the centrifuging rotor.

Lastly, the currently marketed centrifuging devices have external dimensions, and in particular an external height, which prevents them from being put on the working plane of laboratory robots or analyzers.

Consequently, because of the difficulties involved with the centrifuging step in an automatic sequence of steps according to a specific experimental protocol, new separation techniques have recently been developed.

For example, in the field of biotechnology, separation columns based on molecular differentiation as a function of size have been developed.

Other techniques for the replacement of centrifuging consist in using a principle of affinity-binding of molecules on magnetic beads.

These new steps, corresponding to new steps for the replacement of centrifuging, nevertheless have certain problems when they are integrated in an automated experimental protocol.

In the case of separation columns, in particular, it is generally difficult to control the flow rate of the various columns which are placed on a laboratory robot or analyzer.

As regards the use of magnetic beads, these represent a cost which is still significant, and this rules out its integration in large-scale processing of samples.

SUMMARY OF THE INVENTION

In order to overcome the various aforementioned drawbacks of the prior art, the present invention provides a novel device for centrifuging various samples of a product or a mixture of products which are chemical or biological, which is intended to be positioned on a horizontal working plane whose available area is less than or equal to 0.4 $m^2$, in order to cooperate with a laboratory analyzer mounted in proximity to the working plane for automatically performing biological or chemical reactions according to a specific protocol, the external useful height of which centrifuging device is less than or equal to about 20 cm.

Advantageously, this centrifuging device comprises in a casing:

- a vessel which is open at the top and contains a vertical central shaft driven in rotation by a rotary driving means,
- a horizontal plate, mounted interlocked in rotation on the central shaft and provided on its surface with a plurality of through orifices for the vertical mounting of tubes which are each intended to contain a volume of a sample to be centrifuged, these mounting orifices having a substantially elongate shape with front and rear walls inclined at an acute angle of less than 90 degrees relative to the horizontal, and
- means for indexing the position of the plate each time the plate stops, in order to position said mounting orifices of the tubes at predetermined sites.

The centrifuging device according to the invention hence makes it possible, in a small volume matched to the available area of a laboratory working plane on which a laboratory analyzer is mounted, to position a large number (greater than or equal to about 48) of tubes containing samples in a vertical position when stopped, and to centrifuge these tubes in a suitable inclined position so that the samples contained in the tubes stay in the tubes, with centrifuging concentrates positioned correctly in the bottom of the tubes, and while preventing the tubes located on the outer edge of the plate from bending so as to deform plastically under the effect of the acceleration which they experience.

When the centrifuging cycle is completed, the tubes positioned in their mounting orifices of the plate of the device according to the invention return to the vertical position under the effect of their own weight, and the indexing means of said device position the plate so that the tubes are at a specific position, which allows a laboratory analyzer or robot head to take the full amount of the centrifuged samples from each tube.

According to an advantageous variant of the centrifuging device according to the invention, it comprises in a casing:

a vessel which is open at the top and contains a vertical central shaft driven in rotation by a rotary driving means, a horizontal plate, mounted interlocked in rotation on the central shaft and provided with arrangements for the parallel mounting, in proximity to each other, of two swing trays for supporting two sample-receptacle holders which can pivot freely about a horizontal axis in order to assume a horizontally inclined position during the rotation of the plate, and means for indexing the position of the plate each time the plate stops, in order to position said swing trays at predetermined sites.

These receptacle holders are preferably microplates.

Advantageously, in this case, the plate has two diametrically opposite notches in which the swing trays are mounted so as to pivot in such a way that the pivoting axis of said swing trays is offset toward the center of the plate relative to the vertical axis passing through the center of gravity of each swing tray.

This makes it possible, when the plate is stopped after a centrifuging cycle, for the swing trays to return automatically under the effect of their own weight against a stop which secures them in a vertical position of stable equilibrium.

According to another embodiment of the centrifuging device in accordance with the invention, the horizontal plate may be provided with said orifices for mounting the tubes and have arrangements for the parallel mounting of said pivoting swing trays which support the microplates.

Furthermore, according to another embodiment, the centrifuging device in accordance with the invention may have two identical vessels containing two identical plates which are linked in rotation and are driven simultaneously by a rotary driving means.

According to other characteristics of the device in accordance with the invention:

the rear and front walls of said mounting orifices of the plate are inclined by an angle of less than or equal to 60 degrees relative to the horizontal, the indexing means of each plate comprise a disk which is mounted below each plate so as to be interlocked in rotation with the vertical drive shaft and is provided with a recess provided in its outer peripheral edge, a horizontal finger which is held in contact with the disk by an elastic means when the plate is stopped and when it is being indexed and is separated from the disk by an actuator when the plate is rotating in the centrifuging phase, and means for pivoting the plate stepwise in the indexing phase until said finger cooperates with the recess of said disk, it has a lid which closes the vessel or vessels and is mounted so as to pivot on the casing, it has a lid which closes the vessel(s) and is mounted so as to slide on the casing, said indexing means comprising a rack of specific length which is provided on the inner face of the closure lid and is intended to cooperate with a toothed-sector wheel carried by the drive shaft of a plate, when opening the vessel(s) by sliding the lid, the vessel in the shape of a cylinder of revolution has a diameter of the order of 300 mm, a height of the order of 85 mm, for a horizontal plate with a diameter of the order of 270 mm, the casing enclosing the vessel having an external width and length of the order of 320 mm and a height of the order of 120 mm, the size of the mounting orifices of each plate is designed to hold tubes with a volume equal to 2 ml or 5 ml, the maximum rotational speed of the plate, in the case when it holds tubes with a volume equal to 2 ml, is of the order of 13,000 revolutions/minute and, in the case when it holds tubes with a volume equal to about 5 ml, is of the order of 4500 revolutions/minute with swing trays, and without any swing tray the maximum rotational speed of the plate with tubes having a volume of 5 ml is of the order of 5000 revolutions/minute.

The description which follows with reference to the appended drawings, which are given by way of nonlimiting examples, will clearly show what the invention consists of and how it can be implemented.

DETAILED DESCRIPTION

Figure 1:
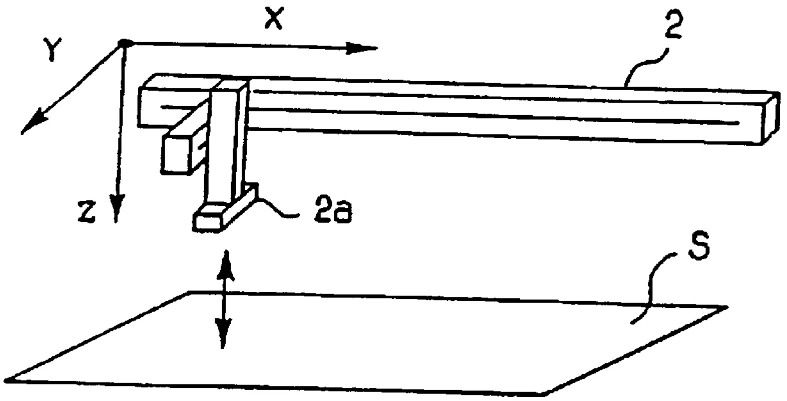
FIG. 1 is a diagrammatic perspective view of the useful surface of a working plane, on top of which there is a laboratory robot or analyzer.
Figure 2:
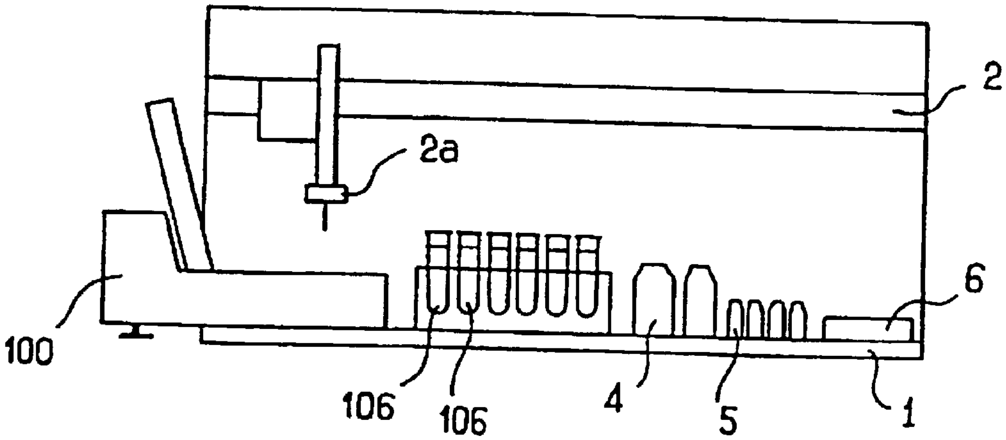
FIG. 2 is a diagrammatic side view of a working plane of the laboratory, on which the centrifuging device according to the invention and various accessories, as well as the laboratory robot or analyzer, are positioned.

Referring to FIGS. 1 and 2, a working plane 1 has been represented, on which a laboratory robot or analyzer 2 works in order automatically to carry out experimental protocols in the field of chemistry, biochemistry or biology.

To that end, in the known way, the robot 2 is mounted in proximity to the working plane 1 and has a head 2*a* which can be moved vertically and horizontally along mutually perpendicular axes X, Y and Z so as to reach various sites on the working plane, where tubes 106 intended to contain various samples of a product or a mixture of products which are chemical or biological, reagent receptacles 4, 5 and accessories 6 such as a water bath, cooling apparatus or the like are arranged.

The maximum height available between the head 2*a* of the robot 2 and the working plane 1 is of the order of 20 cm, and the useful area 1 of the working plane 1 swept by the robot is less than or equal to 0.4 m.

In this aforementioned available volume, taking account of the aforementioned elements which are already positioned on the working plane, a centrifuging device 100 is positioned with which the robot 2 cooperates in order automatically to carry out a step of centrifuging samples for the implementation of chemical or biological reactions according to specific automated experimental protocols.

Figure 3:
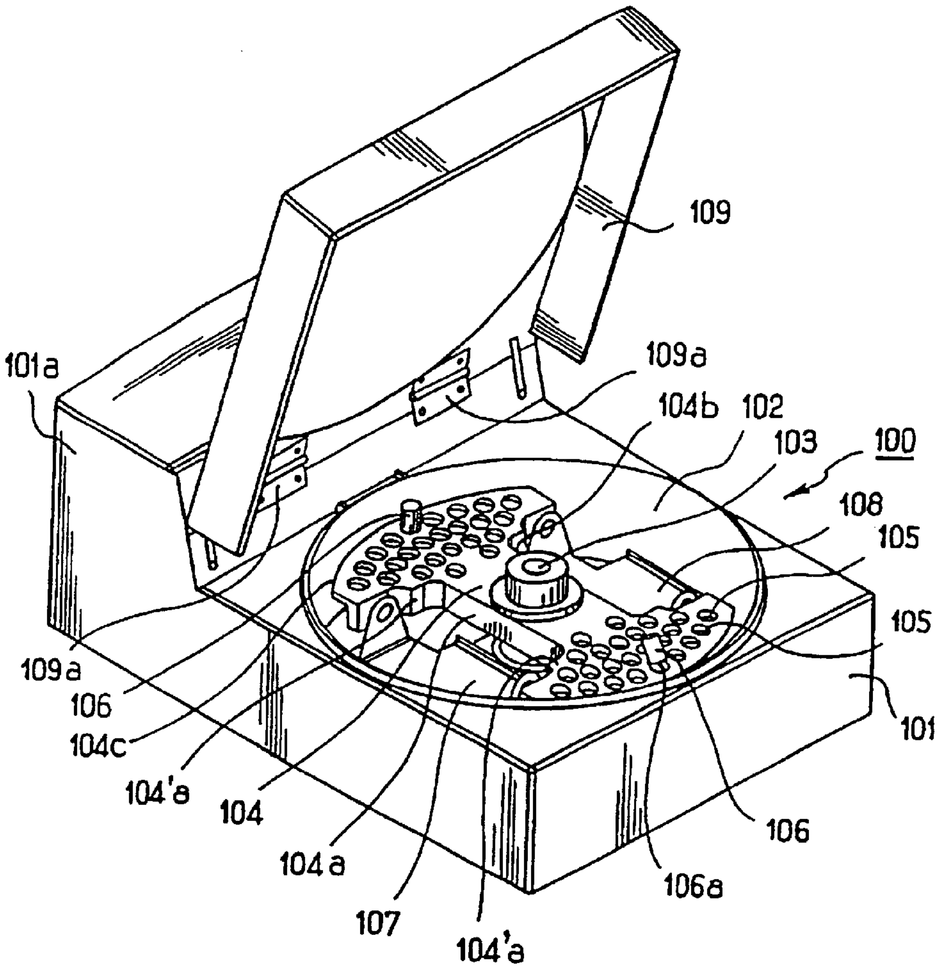
FIG. 3 is a diagrammatic perspective view of an embodiment of the centrifuging device.
Figure 4:
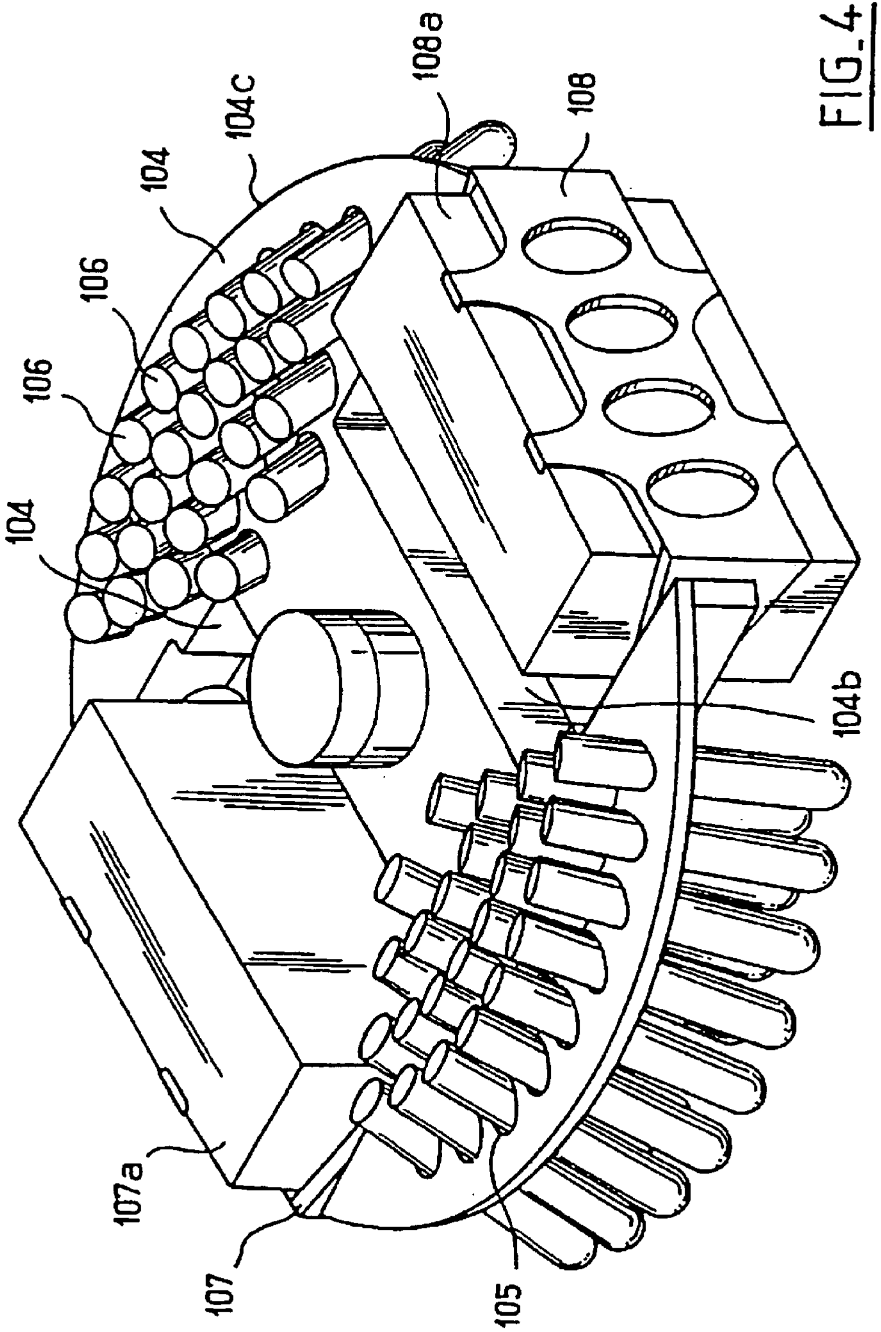
FIG. 4 is a diagrammatic perspective detail view of the plate represented in rotation of the centrifuging device in FIG. 3, on which the sample tubes and microplates are positioned.
Figure 6:
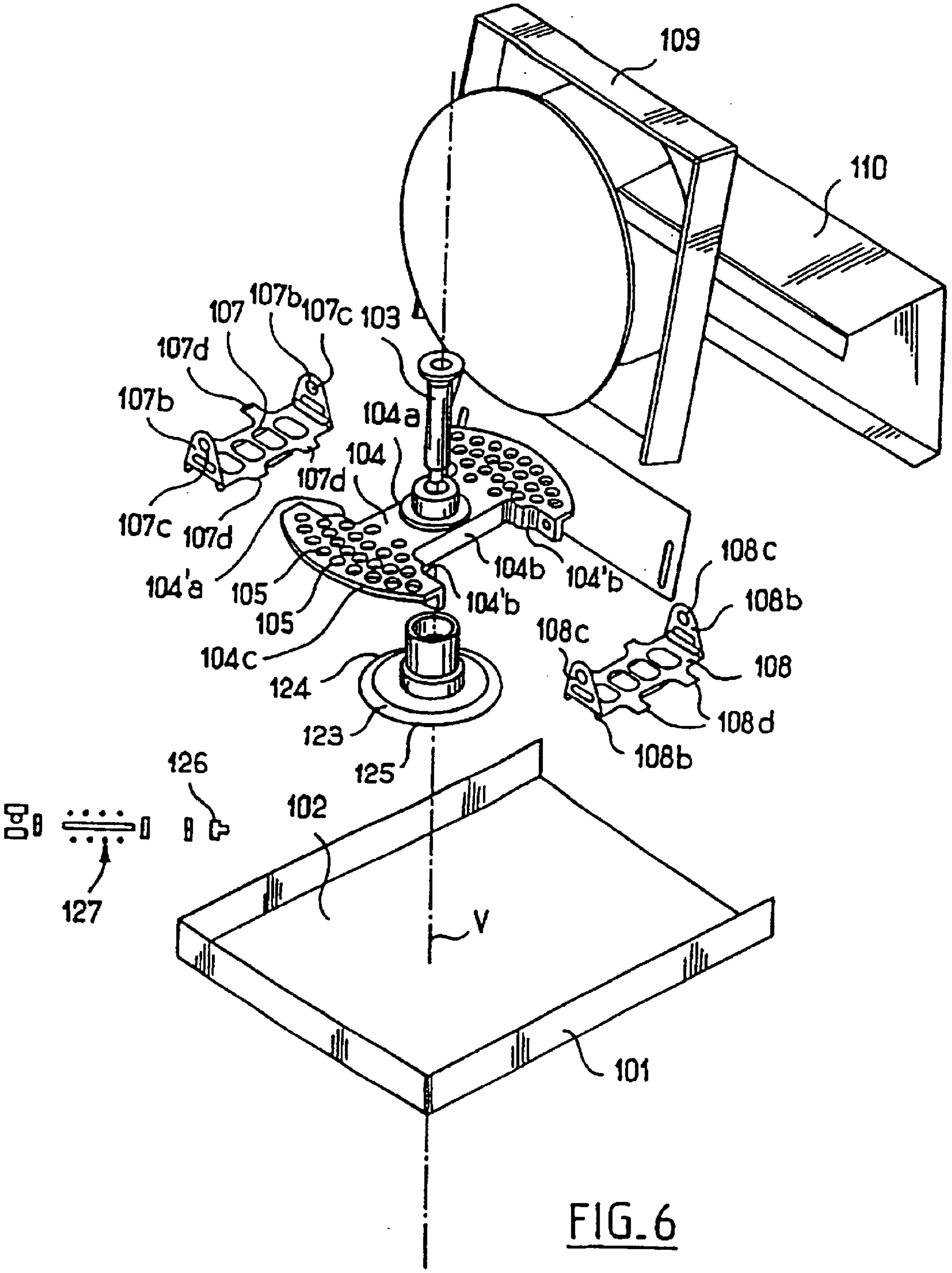
FIG. 6 is an exploded view of the centrifuging device in FIG. 3.

Referring first to FIGS. 3, 4 and 6, this centrifuging device 100 has, in a casing 101, a vessel 102 which is open at the top and contains a vertical central shaft 103 driven in rotation about its axis V by means of a rotary driving means, here an electric or pneumatic motor (not shown). A horizontal plate 104 is mounted on this vertical rotary drive shaft 103 so that it is interlocked in rotation with said shaft 103.

According to the embodiment represented in these figures, the plate 104 is of circular overall shape and has two notches 104*a*, 104*b* which each have a vertical back wall, the two vertical back walls being parallel and arranged very close to the rotary drive shaft 103, and two opposite side walls which extend radially as far as the outer peripheral edge 104*c* of the plate 104, each side wall having a shoulder 104*a*, 104'*b* forming a stop projecting outwards.

The majority of the surface of the horizontal plate 104 is provided with through orifices 105, having vertical axes, for the mounting in a vertical position of tubes 106 which are intended to contain volumes of samples to be centrifuged. To that end, the tubes 106, which are made conventionally of a plastic material such as polyethylene, have a holding collar 106*a* on their outer surface, in proximity to their upper opening, so that when the plate 104 is in a stopped position, said tubes 106 engaged in the through orifices 105 are positioned vertically while resting on the plate 104 via the holding collar 106*a*.

The mounting orifices 105 are arranged along arcs of circles which are concentric with the rotary drive shaft 103, distributed between the outer peripheral edge 104*c* of the plate 104 and its central region.

Furthermore, according to the embodiment represented in FIGS. 3, 4 and 6, the plate 104 carries, in each of its notches 104*a*, 104*b*, a swing tray 107, 108 which supports a holder for receptacles of products to be centrifuged, here a microplate of 96 wells 107*a*, 108*a*. Each swing tray 107, 108 comprises a base supporting a microplate and two parallel uprights 107*b*, 108*b* provided with openings 107*c*, 108*c* for mounting it on the plate 104. The bases supporting the swing trays 107, 108 comprise tabs 107*d*, 108*d* for securing and locking the microplates on said swing trays. Each swing tray 107, 108 is mounted so as to pivot freely on horizontal bearings carried by the side walls of each notch 104*a*, 104*b* so that it can change from a vertical equilibrium position when the plate 104 is stopped, with its support base horizontal (see FIG. 3), for loading the microplates and injecting and withdrawing samples, to a horizontal equilibrium position when the plate is rotating, with its support base vertical (see FIG. 4).

The dimensions of the notches 104*a*, 104*b* of the plate 104 are such that the swing trays 107, 108 are as close as possible to each other, here the minimum distance between said swing trays when stopped is of the order of 70 mm.

Advantageously, the swing trays 107, 108 are pivotally mounted in such a way that, when the plate is stopped, each swing tray returns under the effect of its own weight into a vertical stable position with its uprights 107*b*, 108*b* bearing against said stops 104*a*, 104*b* of the notches 104*a*, 104*b* of the plate 104. To that end, the horizontal pivoting axis of each swing tray is offset toward the center of the plate 104 relative to the vertical axis passing through the center of gravity of said swing tray.

The swing trays 107, 108 are, for example, made of a metallic material, preferably high-strength inoxe®, so that they can withstand, without plastically deforming, the centrifugal force exerted on them when the plate rotates, this being a force which can reach a very high value in excess of one tonne. As a variant, the swing trays may also be made of a composite material such as carbon.

The plate 104 is made of a metallic material, preferably a low-density material, here a high-strength aluminum alloy protected by chemical nickel plating in order to comply with sanitary standards.

According to the example represented in FIGS. 3, 4 and 6, the vessel 102 in the shape of a cylinder of revolution about the central axis V has a diameter of the order of 300 mm, preferably 305 mm, and a height of the order of 85 mm, which gives a diameter of the order of 270 mm for the horizontal plate 104. There is therefore very little space, about 15 mm, available between the outer peripheral edge 104*c* of the plate 104 and the cylindrical wall of the vessel 102. Furthermore, the part of the plate 104 provided with the mounting orifices 105 has a thickness of the order of 5 mm and, at the notches 104*a*, 104*b*, said plate 104 has a thickness of the order of 25 mm. The part of the casing 101 containing the vessel 102 has an external width and length of the order of 320 mm. The casing 101 is extended here laterally to contain the electronics used for automated control of the operation of the centrifuging device, in particular starting and stopping the rotary drive motor, and control of the closing and opening of the closure lid 109 of the vessel 102. The casing hence has a total length of the order of 480 mm. The height of the casing 101, level with the vessel 102, is of the order of 120 mm, preferably of the order of 117 mm and, level with the electronics, of the order of 200 mm.

Of course, according to a variant (not shown), the control electronics part may be decoupled from the vessel part of said centrifuging device, by positioning the control electronics in a different casing which is positioned at a different site on the working plane, and the electronics may be connected to the vessel part containing the rotary drive motor by electrical connection wires. Only the part of the casing directly enclosing the vessel hence needs to be taken into consideration when evaluating the external dimensions of the centrifuging device 100.

In the embodiment represented in FIGS. 3, 4 and 6, the plate 104 has 48 orifices for supporting 48 tubes 106.

The size of the mounting orifices 105 is designed to hold tubes with a volume equal to about 5 ml. The maximum rotational speed of the plate 104, which carries the swing trays 107, 108, is of the order of 4500 revolutions/minute. This maximum rotational speed gives a centrifugal thrust, exerted on said rotating swing trays, of the order of 1.5 tonnes, which is the upper limit tolerable by the swing trays so that they do not the form plastically.

Of course, according to a variant (not shown), the turning plate may be a solid disk of constant thickness, for example of the order of 5 mm, which is provided over its entire surface with through orifices for the mounting of tubes containing the samples to be centrifuged, and which does not have arrangements for the mounting of swing trays supporting microplates. These mounting orifices which, for example, are identical to those of the version represented in the aforementioned figures will then be distributed along circles concentric with the drive shaft of the plate. In this case, the number of mounting orifices would be at least doubled and around one hundred tubes carried by the plate would be achieved. According to this variant, the maximum rotational speed of the plate is then of the order of 5000 revolutions/minute. A small number of orifices, but with larger dimensions for tubes with greater volumes, may also be envisaged.

Figure 5:
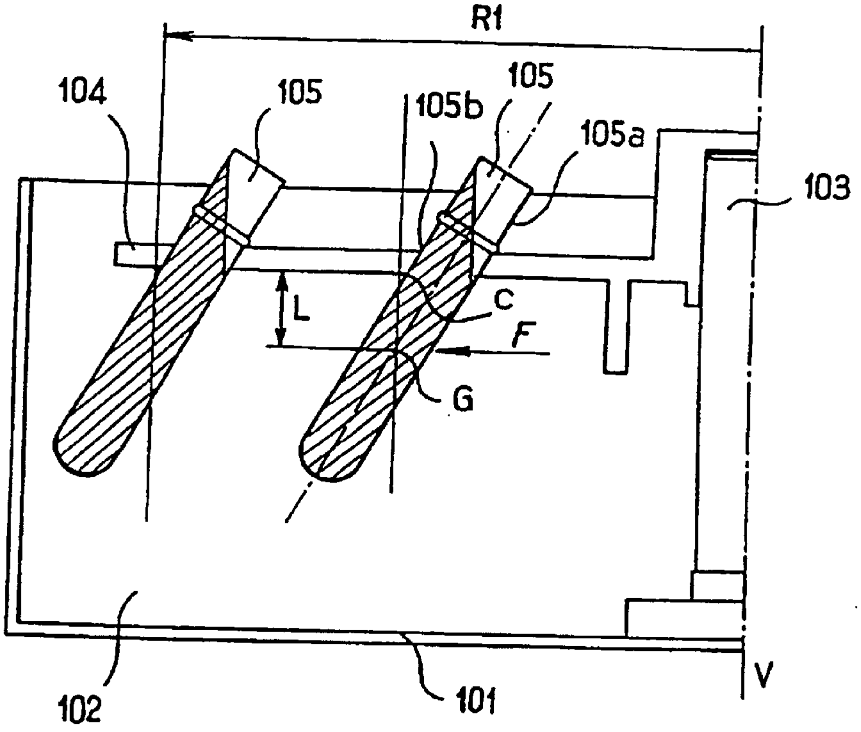
FIG. 5 is a partial diagrammatic view in section of the centrifuging device according to the invention.

As shown more particularly by FIG. 5, each orifice for mounting the tubes 105 has an elongate shape, here oblong, with parallel rear 105*a* and front 105*b* walls inclined by an acute angle of less than 90 degrees relative to the horizontal. The front and the rear are defined here in terms of moving away from the axis V of rotation of the plate. More particularly, according to the typical case represented in FIG. 5, the angle of inclination relative to the horizontal of said rear and front walls of each orifice 105 is less than or equal to 60 degrees.

The tubes 106, which are positioned vertically in said orifices when the plate is stopped, hence assume an inclined position, which is here 30 degrees relative to the vertical or 60 degrees relative to the horizontal, under the effect of the centrifugal force when the plate rotates.

At this inclination, the sample contained in each rotating tube does not overspill the tube, the centrifuging concentrate is properly positioned at the bottom of the tube, as is desirable, and above all the deformation of the tubes positioned outermost on the plate, which is due to the centrifugal force, stays below the elastic deformation limit of said tubes.

More particularly, in order to determine the inclination slope of said rear and front walls of said orifices, the following elements are taken into account.

Firstly, this angle of inclination is determined such that, for a given tube mass, the acceleration experienced by the tubes located outermost on the plate (distance R1) does not cause their permanent deformation.

In particular, for a given angle of inclination, the deformation amplitude of these tubes should be less than a limiting value above which the tube plastically deforms.

The amplitude is given by the following formula:

$$A=F.L^3/8.E.I, \text{ where}$$

- E is the modulus of elasticity of the material used for the tube,
- I is the stressed cross section,
- F is the centrifugal force applied to the tube, and
- L is the distance between the center of gravity G of the tube and the point C where the tube is pivoted in the mounting orifice.

In the example represented in FIGS. 3 and 5, assuming a density equal to 1 and a sample volume of 5 ml contained in the tube, the mass to be taken into consideration is hence equal to 5 g. For a rotational speed of 4500 revolutions/minute, the acceleration experienced by said tubes located at the outside of the plate is of the order of 14,000 G, which gives a centrifugal force F equal to 17 newtons. Knowing the values of E and I for a given tube, a check was made that an angle of inclination of 30 degrees relative to the vertical gave a value of the amplitude below said limiting value (L=a sin(30) is here equal to 16 mm, a representing the distance between the pivoting point C and the center of the mounting orifice). In the illustrative embodiment represented in the FIGS. 3, 4, 5 and 6, the limiting value of the amplitude is reached for a centrifugal force of the order of 140 newtons.

A check was then made that this angle of inclination makes it possible, during the rotation of the plate, to contain all of the sample volumes in the tubes located at the outside of the plate, since they are the ones which experience the strongest acceleration. This is the case when the center of gravity G of the sample is placed precisely below the point where the tube is pivoted in the orifice.

Furthermore, the centrifuging device 100 represented in FIG. 3 has a lid 109 which closes the vessel 102. This lid 109 is here mounted so as to pivot via hinges 109*a* on the casing 101. The closure lid 109 has a height of about 55 mm. When it is opened, however, its dimension exceeds the height available under the head of the laboratory robot.

As shown in FIG. 2, the centrifuging device 100 is hence positioned on the working plane 1 so that only the vessel part is located in the useful surface S of the latter, which is swept by the head of the robot, and the electronics part of the casing of this centrifuging device as well as its closure lid, when opened, are located outside this useful surface S of said working plane 1.

Figure 7:
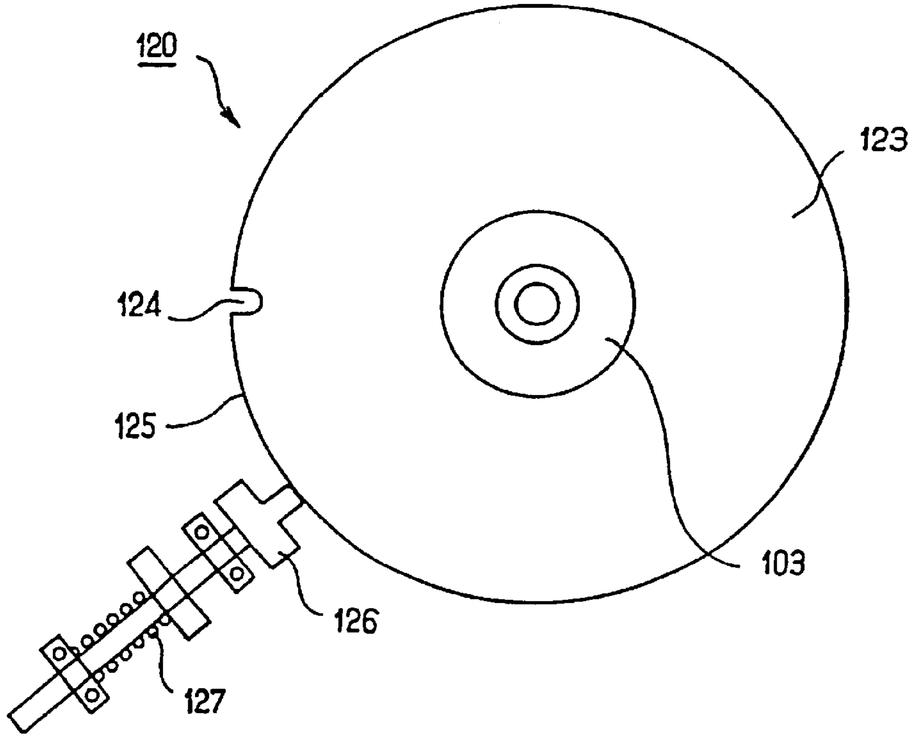
FIG. 7 is a diagrammatic plan view of an embodiment of the device of the indexing means of the centrifuging device in FIG. 6.

Furthermore, as shown more particularly by FIGS. 6 and 7, the centrifuging device has means 120 for indexing the position of the plate 104, each time said plate stops, in order to position the mounting orifices of said tubes and said swing trays at the same specific sites each time. The indexing means 120 comprise here, on the one hand, a disk 123 which is mounted below the plate 104 so as to be interlocked with the rotary drive shaft 103 and is provided with a recess 124 provided in its outer peripheral edge 125, and, on the other hand, a horizontal finger 126 which is actuated using an elastic means 127, for example a spring and electromagnet, between a separated position, when the plate is driven in rotation during the centrifuging phase, and a position bearing against the outer peripheral edge 125 of the disk 123, after the plate has been stopped. The horizontal finger 126 is held bearing against the disk 123 when the plate is rotated stepwise about its axis of rotation until cooperating with the recess 124 of the disk, where the plate is positioned in a specific way. The stepwise rotation of the plate with a view to indexing it may be carried out either by the main motor in successive pulses, or by a secondary actuator.

Figure 8:
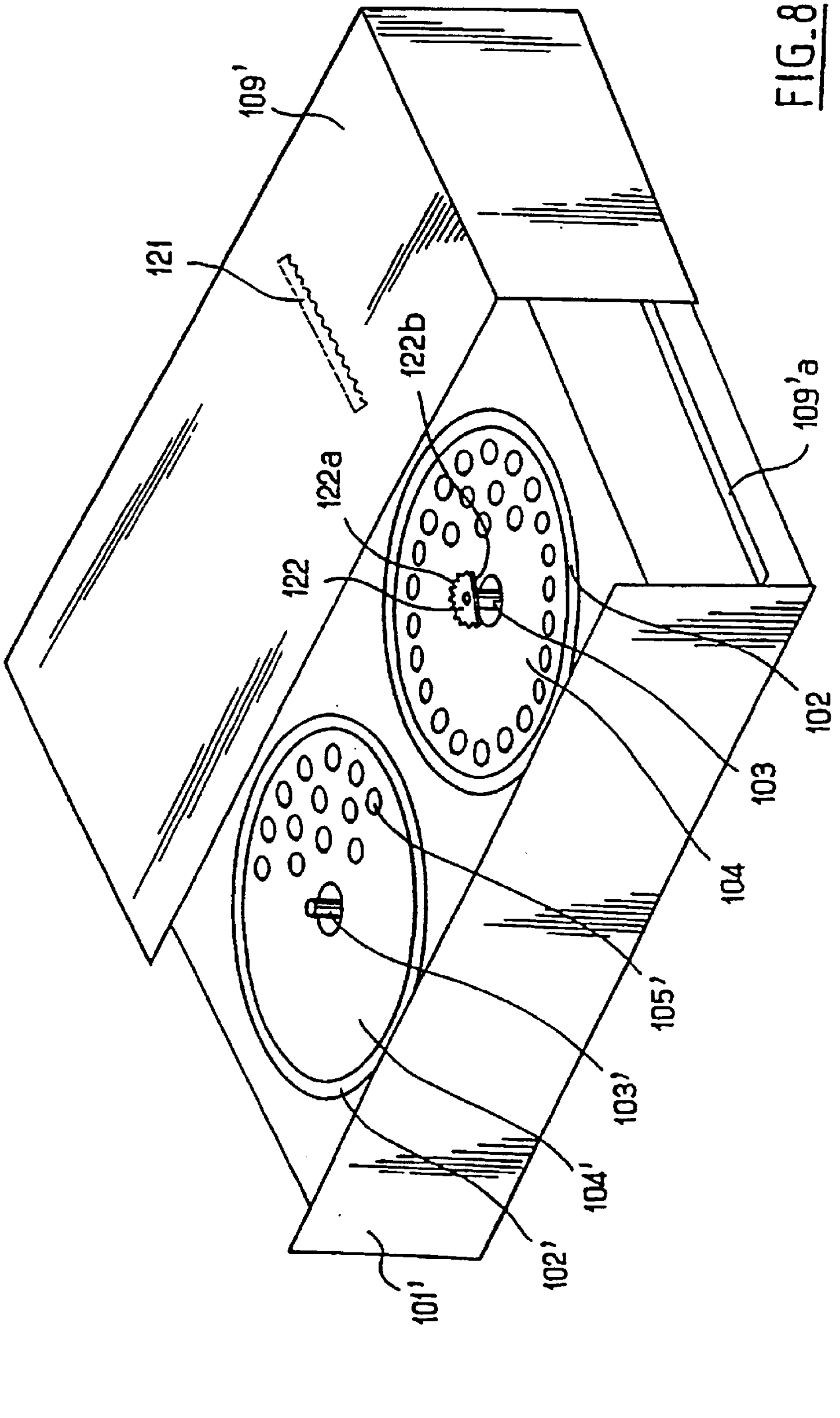
FIG. 8 is a diagrammatic view of an alternative embodiment of the centrifuging device according to the invention.

FIG. 8 represents an alternative embodiment of the centrifuging device, according to which it has, in a casing 101', two identical vessels 102, 102' of smaller volume which are each provided with a turning horizontal plate 104, 104'.

Each plate 104, 104' is driven in rotation by means of a vertical central shaft 103, 103'. The vertical shafts 103, 103' are linked in rotation by a notched belt system, for example, and are driven simultaneously in rotation by means of a single drive motor (not shown).

According to this variant, each plate 104, 104' is provided over its entire surface with orifices 105, 105' for the mounting of tubes intended to contain samples to be centrifuged.

Here, the size of the orifices 105, 1051 is such that they hold tubes with a volume of the order of 2 ml.

The maximum rotational speed of the plates is hence of the order of 13,000 revolutions/minute.

Of course, the external dimensions of the casing 101' are similar to those of the casing 101 of the first embodiment described.

Lastly, the centrifuging device represented in FIG. 8 has a lid 109' which closes two vessels 102, 102' and is mounted so as to slide by means of a rail on the casing.

In this case, the means for indexing the position of the plates after the latter have been stopped comprises a rack 121 which is positioned on the inner face of the lid 109' and a toothed-sector wheel 122 mounted on a rotational drive shaft 103 of a plate.

The rack of specific length becomes active when the lid 109' is opened, whereupon it cooperates with the toothed sector 122*a* of the wheel 122, and is inactivated when the flat 122*b* of the wheel 122 is parallel to it. When the lid is closed, since the indexing has already taken place, the rack will then systematically find the parallel flat 122*b* of said wheel 122, and will in this case clearly be inactive.

The present invention is in no way limited to the embodiments which have been described and represented, and the person skilled in the art will be able to add any variation to it in accordance with its spirit.

In particular, according to one variant (not shown), the plate of the centrifuging device may not have orifices and may be used only as a support for the pivotal mounting of said swing trays.

What is claimed is:

1. Device for centrifuging various samples of a product or a mixture of products which are chemical or biological, which is intended to be positioned on a horizontal working plane including an available area (S) that is less than or equal to about 0.4 $m^2$, in order to cooperate with a laboratory analyzer mounted in proximity to the working plane for automatically performing biological or chemical reactions according to a predetermined protocol, the external useful height of which centrifuging device is less than or equal to about 20 cm, comprising in a casing:

a vessel which is open at the top and contains a vertical central shaft driven in rotation by a rotary driving means, a horizontal plate, mounted interlocked in rotation on the central shaft and provided with arrangements for parallel mounting of two swing trays, in proximity to each other, for supporting two sample-receptacle holders which can pivot freely about a horizontal axis in order to assume a horizontally inclined position during the rotation of the plate, and means for indexing the position of the plate each time the plate stops, in order to position said swing trays at predetermined sites; wherein the horizontal plate is provided with through orifices that extend from the bottom of the horizontal plate to the top of the horizontal plate adapted for the mounting of tubes; and wherein the device is adapted to automatically receive tubes from the laboratory analyzer and to automatically permit the laboratory analyzer to retrieve tubes from the laboratory analyzer to perform biological or chemical reactions.

2. Device according to claim 1, wherein the device includes two identical vessels containing two identical plates which are linked in rotation and are driven simultaneously by a rotary driving means.

3. Device according to claim 1, wherein a rear and front walls of the through orifices of the plate are inclined by an angle of less than or equal to 60 degrees relative to the horizontal.

4. Device according to claim 1, wherein the maximum rotational speed of the plate is about 4500 revolutions/minute.

5. Device according to claim 1, wherein the maximum rotational speed of the plate is about 5000 revolutions/minute.

6. Device according to claim 1, wherein the horizontal plate has about 48 through orifices for mounting about 48 tubes.

7. Device according to claim 1, wherein the swing trays are made of metallic material.

8. Device according to claim 1, wherein the swing trays are made of a composite material.

9. Device according to claim 1, wherein the plate is made of a high-strength aluminum alloy covered with chemical nickel plating.

10. Device according to claim 1, wherein the swing trays are made of high-strength metallic material.

11. Device according to claim 1, wherein the swing trays are made of a composite material, the composite material including carbon.

12. Device for centrifuging various samples of a product or a mixture of products which are chemical or biological, which is intended to be positioned on a horizontal working plane including an available area (S) that is less than or equal to about 0.4 $m^2$, in order to cooperate with a laboratory analyzer mounted in proximity to the working plane for automatically performing biological or chemical reactions according to a specific protocol, the external useful height of which centrifuging device is less than or equal to about 20 cm, comprising in a casing:

a vessel which is open at the top and contains a vertical central shaft driven in rotation by a rotary driving means, a horizontal plate, mounted interlocked in rotation on the central shaft and provided on its surface with a plurality of through orifices for the mounting of tubes which are each intended to contain a volume of a sample to be centrifuged, these through orifices having a substantially elongate shape with front and rear walls inclined at an acute angle of less than 90 degrees relative to the horizontal, and means for indexing the position of the plate each time the plate stops, in order to position said through orifices of the tubes at predetermined sites; wherein the horizontal plate is provided with arrangements for the parallel mounting of pivoting swing trays which support microplates.

13. Device according to claim 12, wherein the indexing means of each plate comprise a disk which is mounted below each plate so as to be interlocked in rotation with the vertical central shaft and is provided with a recess provided in its outer peripheral edge, a horizontal finger which is held in contact with the disk by an elastic means when the plate is stopped and when it is being indexed and is separated from the disk by an actuator when the plate is rotating in the centrifuging phase, and means for pivoting the plate stepwise in the indexing phase until said finger cooperates with the recess of the disk.

14. Device according to claim 12, wherein the size of the through orifices of each plate is designed to hold tubes with a volume equal to about 2 ml.

15. Device according to claim 12, wherein the maximum rotational speed of each plate is about 13,000 revolutions/minute.

16. Device according to claim 12, wherein the size of the through orifices of the plate is designed to hold tubes with a volume equal to about 5 ml.

17. Device according to claim 12, wherein the vessel in the shape of a cylinder has a diameter of about 300 millimeters and a height of about 85 millimeters, for a horizontal plate with a diameter of about 270 millimeters, the casing enclosing the vessel having an external width and length of about 320 millimeters and a height of about of 120 millimeters.

18. Device for centrifuging various samples of a product or a mixture of products which are chemical or biological, which is intended to be positioned on a horizontal working plane including an available area (S) that is less than or equal to about 0.4 $m^2$, in order to cooperate with a laboratory analyzer mounted in proximity to the working plane for automatically performing biological or chemical reactions according to a specific protocol, the external useful height of which centrifuging device is less than or equal to about 20 cm, comprising in a casing:

a vessel which is open at the top and contains a vertical central shaft driven in rotation by a rotary driving means, a horizontal plate mounted interlocked in rotation on the central shaft and provided on its surface with a plurality of through orifices for the mounting of tubes which are each intended to contain a volume of a sample to be centrifuged, these through orifices having a substantially elongate shape with front and rear walls inclined at an acute angle of less than 90 degrees relative to the horizontal, and means for indexing the position of the plate each time the plate stops, in order to position said through orifices at predetermined sites; wherein the device is adapted to automatically receive tubes from the laboratory analyzer and to automatically permit the laboratory analyzer to retrieve tubes from the laboratory analyzer to perform biological or chemical reactions; and wherein the device includes a lid which closes the vessel (s) and is mounted so as to slide on the casing, and wherein said indexing means comprise a rack of specific length which is provided on the inner face of the lid and is intended to cooperate with a toothed-sector wheel carried by the drive shaft of the plate, when opening the vessel by sliding said lid.

19. Device for centrifuging various samples of a product or a mixture of products which are chemical or biological, which is intended to be positioned on a horizontal working plane in order to cooperate with a laboratory analyzer mounted in proximity to the horizontal working plane for automatically performing biological or chemical reactions according to a predetermined protocol, the device comprising in a casing:

a vessel which is open at the top and contains a vertical central shaft driven in rotation by a rotary driving means, a horizontal plate, mounted interlocked in rotation on the central shaft and provided with arrangements for parallel mounting, in proximity to each other of two swing trays for supporting two sample-receptacle holders which can pivot freely about a horizontal axis in order to assume a horizontally inclined position during the rotation of the plate, and means for indexing the position of the plate each time the plate stops, in order to position said swing trays at predetermined sites, the plate having two diametrically opposite notches in which the swing trays are mounted so as to pivot; wherein the centrifuging device has an external useful height which is less than or equal to about 20 cm and the horizontal working plane on which it is intended to be positioned has an available area (S) of less than or equal to about 0.4 $m^2$; and wherein the swing trays are mounted in the notches in such a way that a pivoting axis of said swing trays is offset toward the center of the plate relative to a vertical axis passing through the center of gravity of each swing tray when each of said swing trays are at rest; and wherein the horizontal plate is provided with through orifices that extend from the bottom of the horizontal plate to the top of the horizontal plate adapted for the mounting of tubes; and wherein the device is adapted to automatically receive tubes from the laboratory analyzer and to automatically permit the laboratory analyzer to retrieve tubes from the laboratory analyzer to perform biological or chemical reactions.

* * * * *